US 9,036,870 B2
(12) United States Patent
Sugasawa et al.

(10) Patent No.: US 9,036,870 B2
(45) Date of Patent: May 19, 2015

(54) COMMODITY RECOGNITION APPARATUS AND COMMODITY RECOGNITION METHOD

(71) Applicant: TOSHIBA TEC KABUSHIKI KAISHA, Shinagawa-ku, Tokyo (JP)

(72) Inventors: Hiroshi Sugasawa, Miyagi-ken (JP); Hidehiro Naito, Shizuoka-ken (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 50 days.

(21) Appl. No.: 13/965,377

(22) Filed: Aug. 13, 2013

(65) Prior Publication Data

US 2014/0064569 A1 Mar. 6, 2014

(30) Foreign Application Priority Data

Sep. 3, 2012 (JP) .................................. 2012-193071

(51) Int. Cl.
*G06K 9/00* (2006.01)
*G06K 9/03* (2006.01)

(52) U.S. Cl.
CPC ........ *G06K 9/00624* (2013.01); *G06K 9/00671* (2013.01); *G06K 9/03* (2013.01); *G06K 2209/17* (2013.01)

(58) Field of Classification Search
USPC ......... 382/100, 103, 110, 141, 154, 181, 195, 382/199, 203, 254–275; 348/135, 169–172
See application file for complete search history.

(56) References Cited

U.S. PATENT DOCUMENTS

| 5,732,147 | A | * | 3/1998 | Tao ............................... 382/110 |
| 5,845,002 | A | * | 12/1998 | Heck et al. .................... 382/110 |
| 5,867,265 | A | * | 2/1999 | Thomas ......................... 356/328 |
| 6,153,253 | A | * | 11/2000 | Affeldt et al. ..................... 427/8 |
| 6,363,366 | B1 | * | 3/2002 | Henty ............................ 705/400 |
| 6,463,426 | B1 | * | 10/2002 | Lipson et al. ......................... 1/1 |
| 7,137,566 | B2 | * | 11/2006 | Silverbrook et al. ......... 235/494 |
| 8,927,882 | B2 | * | 1/2015 | Teraoka ..................... 177/25.13 |

(Continued)

FOREIGN PATENT DOCUMENTS

| JP | 07-175888 | 7/1995 |
| JP | 10-260960 | 9/1998 |

(Continued)

OTHER PUBLICATIONS

Japanese Office Action for Japanese Patent Application No. 2012-193071 mailed Jun. 10, 2014.

(Continued)

*Primary Examiner* — Anand Bhatnagar
(74) *Attorney, Agent, or Firm* — Amin, Turocy & Watson, LLP

(57) ABSTRACT

A commodity recognition apparatus extracts the appearance feature amount of a commodity included in an image from the captured image, compares the appearance feature amount with the feature amount data of a recognition dictionary, and extracts the candidate of the commodity included in the image. When the selection input of the commodity is accepted from a plurality of commodity candidates, correction data are generated according to the feature amount data of the commodity of which the selection input is accepted and the appearance feature amount data, and the appearance feature amount of the commodity extracted by utilizing the correction data is corrected.

6 Claims, 13 Drawing Sheets

(56) References Cited

U.S. PATENT DOCUMENTS

| | | | | |
|---|---|---|---|---|
| 2002/0111882 | A1* | 8/2002 | Kunigita | 705/27 |
| 2007/0071314 | A1* | 3/2007 | Bhatti et al. | 382/162 |
| 2013/0121571 | A1* | 5/2013 | Gokturk et al. | 382/165 |

FOREIGN PATENT DOCUMENTS

| | | |
|---|---|---|
| JP | 2003-296869 | 10/2003 |
| JP | 2004-184752 | 7/2004 |
| JP | 2007-201556 | 8/2007 |
| JP | 2007-213607 | 8/2007 |
| JP | 2008-158620 | 7/2008 |
| JP | 2009-015596 | 1/2009 |
| JP | 2009-301390 | 12/2009 |
| JP | 2010-237886 | 10/2010 |
| JP | 2012-014602 | 1/2012 |

OTHER PUBLICATIONS

Office Action of Notification of Reason(s) for Refusal for Japanese Patent Application No. 2012-194269 Dated May 27, 2014, 4 pgs.
Office Action of Notice of Rejection for Japanese Patent Application No. 2012-194269 Dated Dec. 16, 2014, 3 pages.

* cited by examiner

COMMODITY RECOGNITION APPARATUS AND COMMODITY RECOGNITION METHOD

CROSS-REFERENCE TO RELATED APPLICATION

This application is based upon and claims the benefit of priority from Japanese Patent Application No. 2012-193071, filed Sep. 3, 2012, the entire contents of which are incorporated herein by reference.

FIELD

Embodiments described herein relate to a commodity recognition apparatus and a commodity recognition method.

BACKGROUND

There is a technology that recognizes the category of an object according to the similarity calculated by extracting the feature amount of the object from the image data of the object captured by an image capturing section and comparing the feature amount with the feature amount data registered in the recognition dictionary. Such a technology for recognizing the object included in an image is called as generic object recognition. About the technologies of the generic object recognition, various recognition technologies are described in the following document.

Keiji Yanai "Present situation and future of generic object recognition", Journal of Information Processing Society, Vol. 48, No. SIG16 [Search on Heisei 22 August 10], Internet <URL: http://mm.cs.uec.ac.jp/IPSJ-TCVIM-Yanai.pdf>

In addition, the technology carrying out the generic object recognition by area division of the image for each object is described in the following document.

Jamie Shotton etc, "Semantic Texton Forests for Image Categorization and Segmentation", [Search on Heisei 22 August 10], Internet <URL:http://citeseerx.ist.psu.edu/viewdoc/download?doi=10.1.1.145.3036&rep=repl&type=pdf>

In recent years, for example, the generic object recognition technology is proposed to be applied in a recognition apparatus for recognizing commodity especially the commodity without a barcode such as vegetables, fruits and the like bought by a customer in a checkout system of a retail store. In this condition, the feature amount data for presenting the surface information such as appearance shape, color, pattern, and concave-convex situation of a recognition object commodity by parameters are stored in the recognition dictionary. The commodity recognition apparatus extracts the feature amount of appearance of the commodity from the image data of the commodity captured by the image capturing module and compares the feature amount with the feature amount data of each commodity registered in the recognition dictionary. And then the commodity recognition apparatus outputs the commodity similar in feature amount as the recognition commodity candidate.

DETAILED DESCRIPTION

In accordance with one embodiment, a commodity recognition apparatus includes a feature amount extraction module, a candidate recognition module, an accepting module, a correction data generating module, a storage module and a correction module. The feature amount extraction module configured to extract the appearance feature amount of a commodity included in an image from the image captured by an image capturing module. The candidate recognition module configured to compare the appearance feature amount data extracted by the feature amount extraction module with the feature amount data of a recognition dictionary storing the feature amount data presenting the surface information of a commodity for each commodity serving as a recognition object to recognize the candidate of the commodity included in the image. The accepting module configured to accept the selection input of a commodity included in the image from a plurality of commodity candidates if a plurality of commodity candidates is recognized by the candidate recognition module. The correction data generating module configured to generate correction data according to the feature amount data of the commodity of which the selection input is accepted by the accepting module and the appearance feature amount data extracted by the feature amount extraction module. The storage module configured to store the correction data generated by the correction data generating module by relating the correction data to the commodity recognition data specifying the commodity of which the selection input is accepted. The correction module configured to correct the appearance feature amount of the commodity extracted by the feature amount extraction module according to the stored correction data.

Hereinafter, the embodiment of the commodity recognition apparatus is described with reference to accompanying drawings. In addition, in the present embodiment, a scanner apparatus 1 and a POS (Point Of Sales) terminal 2 constructing a store checkout system of a retail store handling a vegetable, a fruit and the like as a commodity are enabled to function as a commodity recognition apparatus.

A First Embodiment

First, the first embodiment is described.

Figure 1:
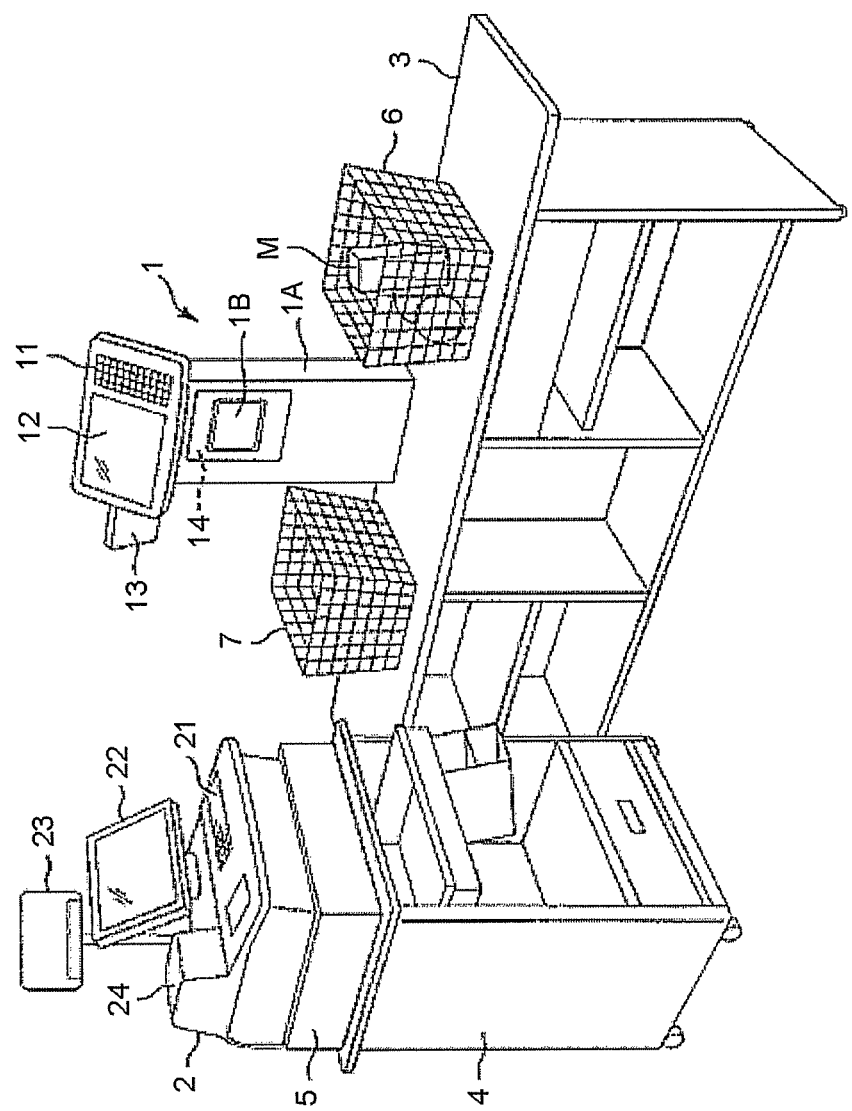
FIG. 1 is an external view of a store checkout system according to one embodiment.

FIG. 1 is an external view of a store checkout system. The system includes a scanner apparatus 1 as a registration section for registering commodities bought by customers and a POS (Point Of Sales) terminal 2 as a settlement section for processing the payment of a customer. The scanner apparatus 1 is installed on a checkout counter 3. The POS terminal 2 is arranged on a checkout table 4 via a drawer 5. The scanner apparatus 1 and the POS terminal 2 are electrically connected with each other through a communication cable 300 (referring to FIG. 2).

The scanner apparatus 1 comprises a keyboard 11, a touch panel 12 and a display for customer 13. Those display or operation devices (keyboard 11, touch panel 12, and display for customer 13) are installed on a thin rectangular housing 1A constituting a main body of the scanner apparatus 1.

An image capturing section 14 is installed in the housing 1A as an image capturing module. In addition, a rectangular reading window 1B is formed on the front surface of the housing 1A. The image capturing section 14 comprises a CCD (Charge Coupled Device) image capturing element as an area image sensor, a drive circuit thereof, and an image capturing lens forming an image of the image capturing area on the CCD image capturing element. The so-called image capturing area refers to the frame image area where the image is formed in the area of the CCD image capturing element after passing through the image capturing lens from the reading window 1B. The image capturing section 14 outputs the image formed in the image capturing area of the CCD image capturing element through the image capturing lens.

The POS terminal 2 comprises a keyboard 21, a display for operator 22, a display for customer 23 and a receipt printer 24 as the necessary devices for settlement.

The checkout counter 3 is an elongated-shape along a customer passage located at the rear side of the checkout counter. The checkout table 4 is arranged substantially perpendicular to the checkout counter 3 in the nearer side of the end of the checkout counter 3 at the downstream side for the movement direction of a customer moving along the checkout counter 3. And the nearer sides of the checkout counter 3 and the checkout table 4 are so called cashier space for salesclerks in charge of settlement.

On the central of the checkout counter 3, the housing 1A of the scanner apparatus 1 is vertically arranged and the keyboard 11, the touch panel 12 and the reading window 1B are located facing cashier side of the nearer side. The display for customer 13 of the scanner apparatus 1 is installed on the housing 1A facing the customer passage.

The commodity receiving surface located on the upstream side of customer movement direction of the scanner apparatus 1 of the checkout counter 3 is the space for placing shopping basket 6 putting the unregistered commodities M bought by customer. On the other side, the commodity receiving surface located on the downstream side is the space for placing shopping basket 7 putting the commodities M registered by the scanner apparatus 1.

Figure 2:
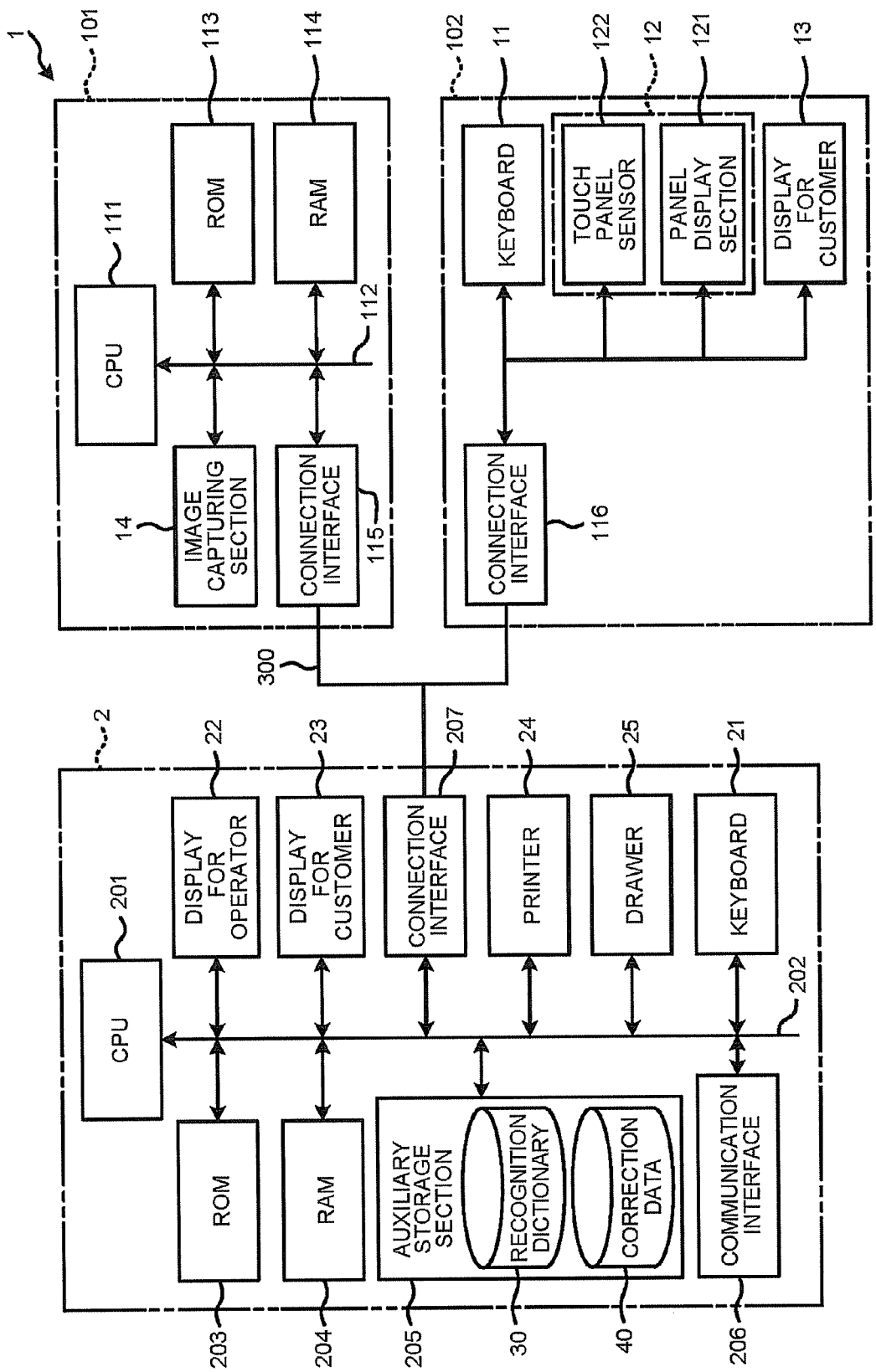
FIG. 2 is a block diagram illustrating hardware configurations of a scanner apparatus and a POS terminal.

FIG. 2 is a block diagram illustrating the hardware configurations of the scanner apparatus 1 and the POS terminal 2. The scanner apparatus 1 comprises a scanner section 101 and an operation and display section 102. The scanner section 101 carries a CPU (Central Processing Unit) 111 as the main body of a control section. And the CPU 111 is connected with a ROM (Read Only Memory) 113 and a RAM (Random Access Memory) 114 via a bus line 112 such as an address, data bus and the like. A method executed by the CPU 111 is stored in the ROM 113.

The image capturing section 14 is connected with the bus line 112 via an input-output circuit (not shown). The keyboard 11, the touch panel 12, and the display for customer 13 are connected with the bus line 112 via a connection interface 115 and a connection interface 116. The touch panel 12, for example, comprises a panel display section 121 with a liquid crystal display and a touch panel sensor 122 which is superposed on the screen of the display section.

The connection interface 116 and the keyboard 11, the touch panel 12 and the display for customer 13 constitute the operation and display section 102. Each section constituting the operation and display section 102 is controlled not only by the CPU 111 of the scanner section 101 but also by a CPU 201 of the POS terminal 2 which is described below.

The POS terminal 2 also carries a CPU 201 as the main body of the control section. And the CPU 201 is connected with a ROM 203, a RAM 204, an auxiliary storage section 205, a communication interface 206 and a connection interface 207 via the bus line 202. In addition, the keyboard 21, display for operator 22, display for customer 23, printer 24 and drawer 5 are respectively connected with the bus line 202 via the input-output circuit (not shown).

The communication interface 206 is connected with a store server (not shown) serving as the center of a store via a network such as LAN (Local Area Network) and the like. Through this connection, the POS terminal 2 can send data to the store server and receive data from the store server.

The connection interface 207 is connected with the two connection interfaces 115, 116 of the scanner apparatus 1 via a communication cable 300. Through the connection, the POS terminal 2 receives the information read by the scanner section 101 of the scanner apparatus 1. In addition, the POS terminal 2 sends and receives data signals between the keyboard 11, the touch panel 12 and the display for customer 13 which constitute the operation and display section 102 of the scanner apparatus 1.

An auxiliary storage section 205 is, for example, a HDD (Hard Disk Drive) apparatus or a SSD (Solids State Drive) apparatus, and moreover, also stores a data file such as the recognition dictionary 30, the correction data 40 and the like as well as various methods.

Figure 3:
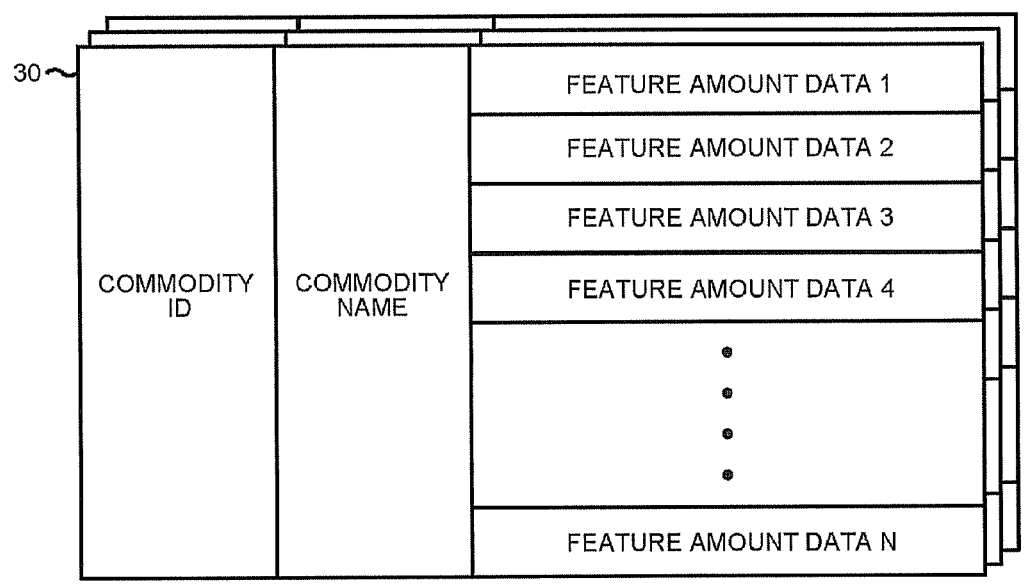
FIG. 3 is a schematic diagram illustrating the structure of dictionary data of each commodity stored in a recognition dictionary.
Figure 4:
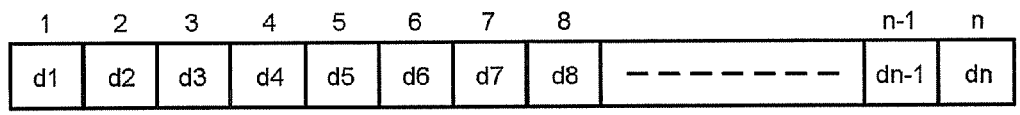
FIG. 4 is a conceptual diagram of feature amount data included in dictionary data.

FIG. 3 is a schematic diagram illustrating the structure of dictionary data of each commodity stored in the recognition dictionary 30. As shown in FIG. 3, a plurality of feature amount data is stored in the recognition dictionary 30 for each commodity as the recognition object, by being related to the commodity ID for recognizing the commodity and the commodity name. The feature amount data present the appearance feature amount, namely, the surface information (appearance shape, color, pattern, concave-convex situation and the like) of the commodity recognized according to corresponding commodity ID by n parameters shown in FIG. 4. And for one piece of commodity, the feature amount data 0 to N of the commodity observed from different directions are respectively stored. In addition, the number of the feature amount data of a commodity (N+1) is not fixed. Moreover, the number of the feature amount data of a commodity (N+1) is different according to commodities. The commodity name can be also excluded in the dictionary data of each commodity.

Figure 5:
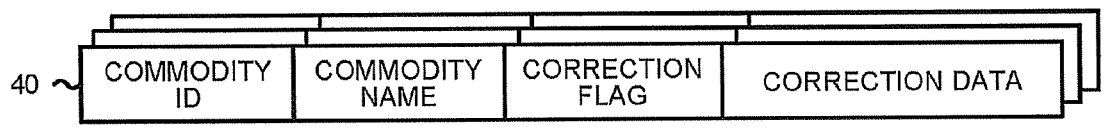
FIG. 5 is a schematic diagram illustrating the structure of correction data of each commodity stored in correction data.

FIG. 5 is a schematic diagram illustrating the structure of the correction data of each commodity stored in the correction data 40. As shown in FIG. 5, a correction flag and the correction data are stored in the correction data 40 for each commodity as the recognition object, by being related to the commodity ID for recognizing the commodity and the commodity name. The correction data correct a R (Red) value, a G (Green) value and a B (Blue) value as the parameter denoting the color in the appearance feature amount serving as surface information of the commodity extracted from the image captured by the image capturing section 14. The correction flag recognizes whether or not to execute the correction based on the corresponding correction data. In addition, the initial value of the correction data is "0". Moreover, the commodity name can be also excluded in the correction data of each commodity.

Figure 6:
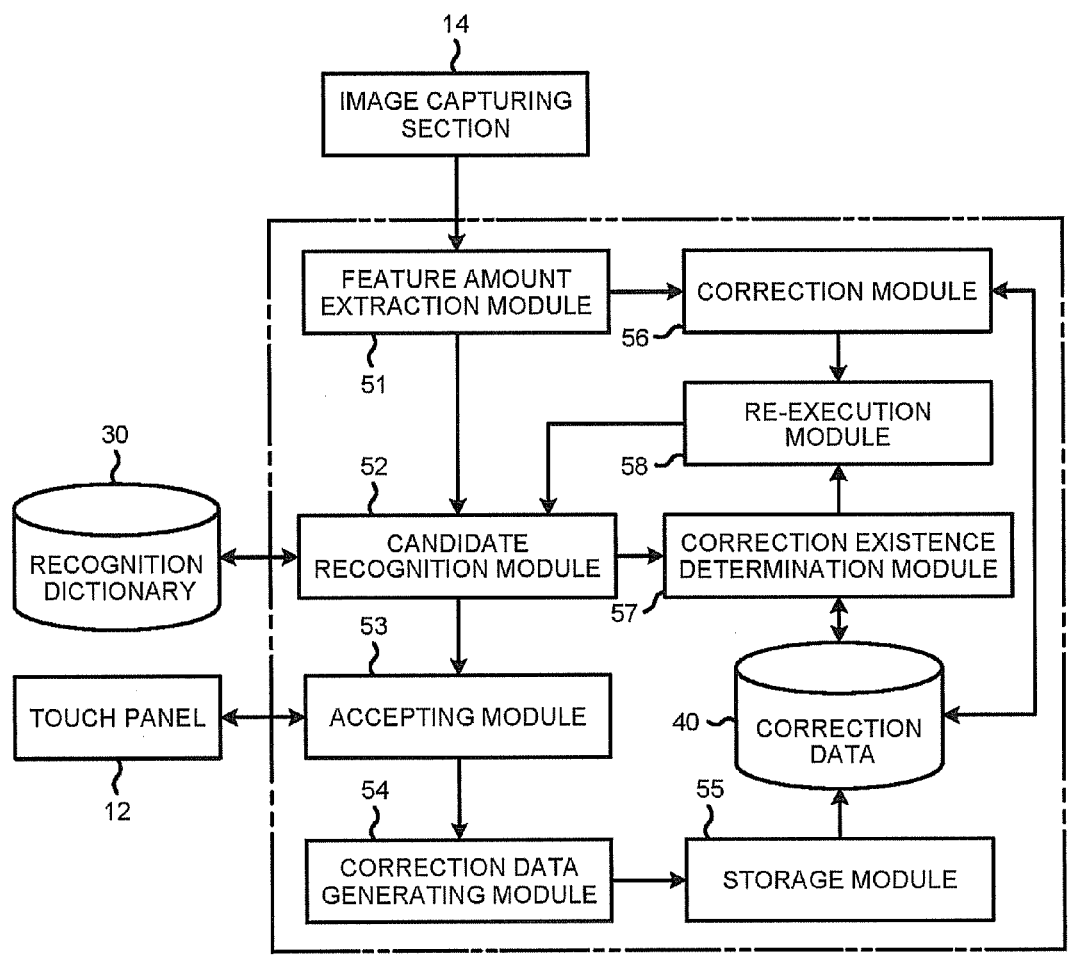
FIG. 6 is a functional block diagram of a commodity recognition apparatus according to a first embodiment.

FIG. 6 is a block diagram for describing the function of the commodity recognition apparatus including the scanner apparatus 1 and the POS terminal 2. The function comprises a feature amount extraction module 51, a candidate recognition module 52, an accepting module 53, a correction data generating module 54, a storage module 55, a correction module 56, a correction existence determination module 57 and a re-execution module 58.

The feature amount extraction module 51 extracts the feature amount of appearance (appearance feature amount) such as the shape, surface color, pattern, and concave-convex situation and the like of the commodity included in the image from the image captured by the image capturing section 14. The candidate recognition module 52 calculates the similarity of the data for each commodity by comparing the appearance feature amount data extracted by the feature amount extraction module 51 with the feature amount data of each commodity stored in the recognition dictionary 30 in sequence, and calculates the similarity of the data for each commodity. A calculation method of the similarity is not particularly limited, for example, the similarity can be also calculated by using a distance method counting the number of different characters located in position corresponding to the feature amount data with equal number of characters. The candidate recognition module 52 recognizes the commodity with similarity higher than a reference as candidate of the commodity included in the image. In addition, the similarity, for example, can be also the degree of coincidence (the rate of coincidence) or the correlation value showing the degree of correlation. That is, the similarity can be also a value obtained based on the feature amount of the image captured by the image capturing section 14 and the feature amount stored in the recognition dictionary 30.

If a plurality of commodities is recognized as the candidate of commodity included in the image by the candidate recognition module 52, the accepting module 53 accepts the selection input of the commodity included in the image from the plurality commodities through the touch panel 12. If the selection input of any commodity from the plurality of commodities is accepted by the accepting module 53, the correction data generating module 54 generates the correction data according to the feature amount data stored in the recognition dictionary 30 of the commodity of which the selection input is accepted and the appearance feature amount data extracted by the feature amount extraction module 51. If the correction data are generated by the correction data generating module 54, the storage module 55 stores the correction data in the correction data 40 serving as the storage section by relating the correction data to the commodity recognition data (commodity ID) specifying the commodity of which the selection input is accepted.

The correction module 56 corrects the value (R value, G value and B value) of the parameter related to the color in the appearance feature amount of the commodity extracted by the feature amount extraction module 51 with the correction data stored in the correction data 40. The correction existence determination module 57 determines whether or not the correction data are stored in the correction data 40 for the commodity recognized as the commodity candidate included in the image by the candidate recognition module 52 with reference to the correction flag added in the correction data. If the correction data are determined to be stored by the correction existence determination module 57, the re-execution module 58 enables the candidate recognition module 52 to carry out re-execution using the appearance feature amount corrected by the correction module 56.

Figure 7:
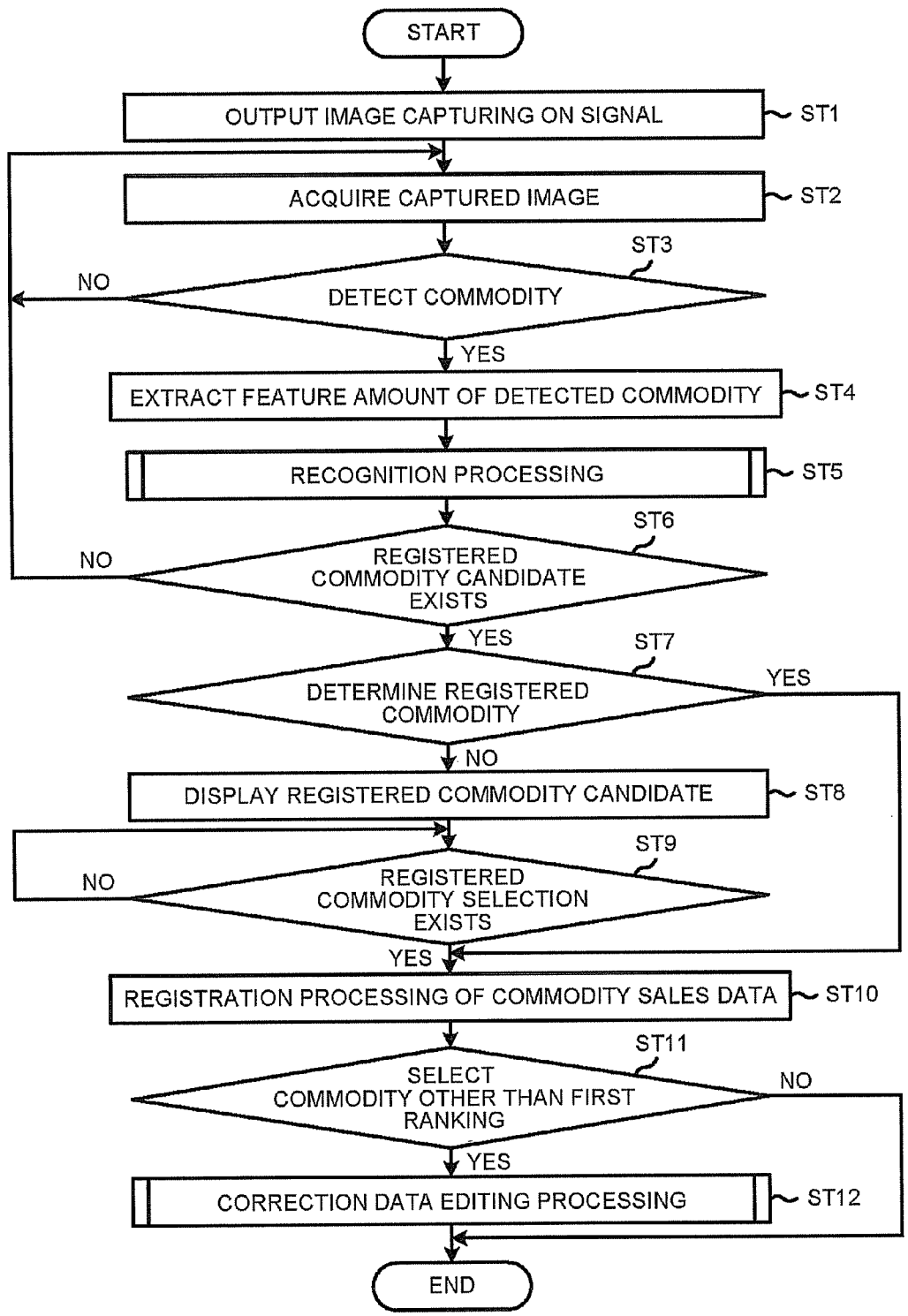
FIG. 7 is a flowchart illustrating the main portion of an information processing procedure executed by a CPU of the commodity recognition apparatus according to a commodity recognition method.

FIG. 7 is a flowchart illustrating the main portion of an information processing procedure executed by the CPU-X (CPU-X denotes the CPU 111 or the CPU 201: the same below) of the commodity recognition apparatus (scanner apparatus 1, POS terminal 2) according to a commodity recognition method.

When the processing in FIG. 7 is started, the CPU-X outputs an image capturing on signal to the image capturing section 14 (ACT ST1). For example, the CPU 201 sends an image capturing on instruction to the CPU 111, and the CPU 111 receiving the instruction outputs the image capturing on signal to the image capturing section 14. The image capturing section 14 starts image capturing in the image capturing area according to the image capturing on signal. The frame images of the image capturing area captured by the image capturing section 14 are sequentially stored in the RAM 114.

The CPU-X acquires the frame image data stored in the RAM 114 (ACT ST2). Then, the CPU-X confirms from the frame image whether or not the commodity is detected (ACT ST3). Specifically, the CPU-X extracts contour lines and the like from the binary image of the frame image. And then, the CPU-X tries to extract the contour of the object reflected in the frame image. If the contour of the object is extracted, the CPU-X takes the image within the contour as a commodity.

When the commodity is not detected from the frame image (NO in ACT ST3), the CPU-X acquires the next frame image from the RAM 114 (ACT ST2). And then, the CPU-X confirms whether or not a commodity is detected from the frame image (ACT ST3).

When the commodity is detected from the frame image (YES in ACT ST3), the CPU-X extracts the feature amount of appearance (appearance feature amount) such as the shape, surface color, pattern, concave-convex situation of the commodity from the image in the contour (ACT ST4: feature amount extraction module 51). The extracted appearance feature amount data are temporarily stored in the work area of the RAM 204.

Figure 8:
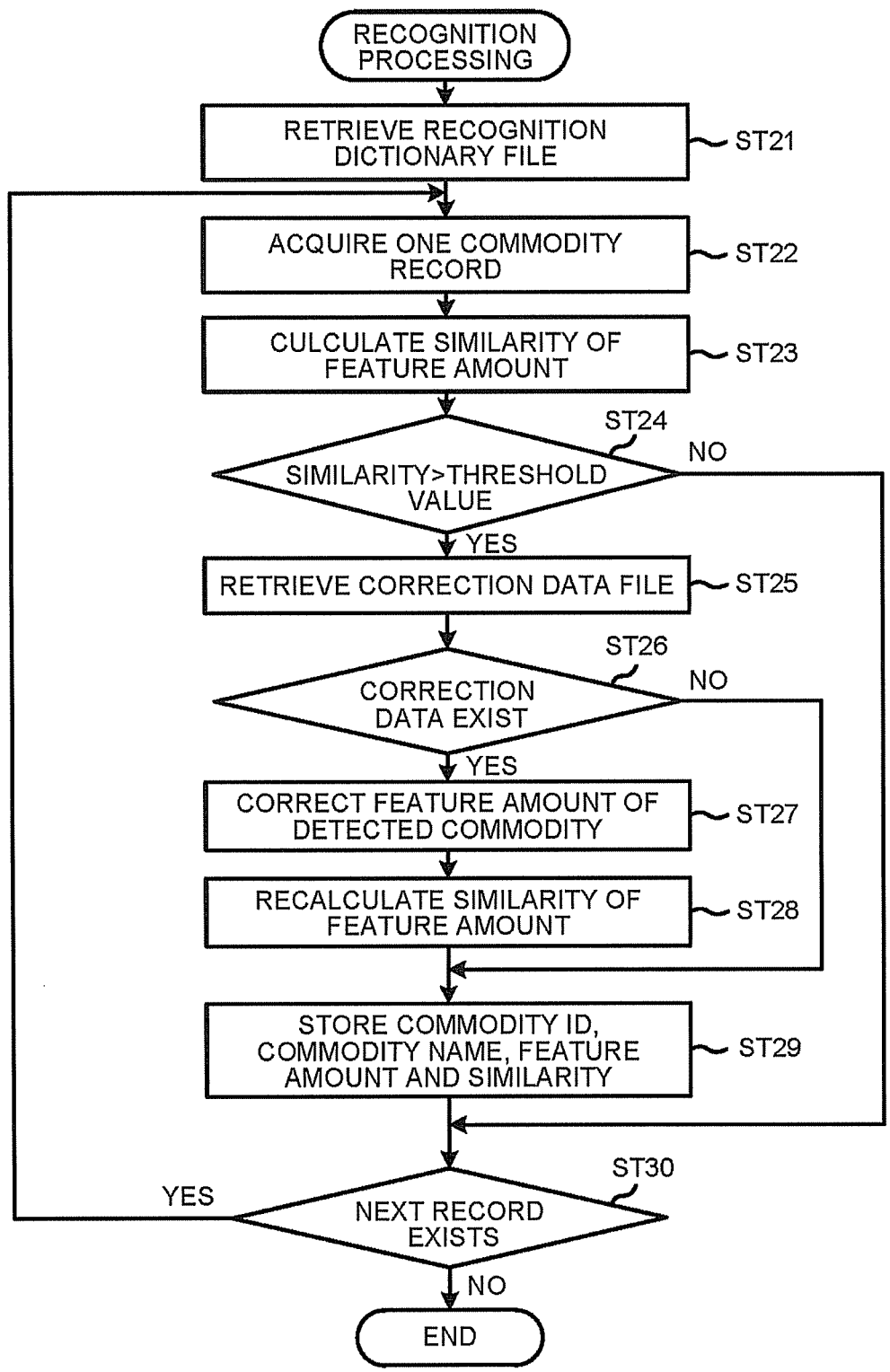
FIG. 8 is a flowchart specifically illustrating a recognition processing procedure shown in ACT ST5 in FIG. 7.

If the extraction of feature amount is finished, the CPU-X executes the recognition processing of procedure specifically shown in the flowchart of FIG. 8 (ACT ST5: candidate recognition module 52). First, the CPU-X retrieves the recognition dictionary 30 (ACT ST21). Then the CPU-X reads the recognition dictionary data (commodity ID, commodity name, and a plurality of feature amount data) of one commodity from the recognition dictionary 30 (ACT ST22).

If the recognition dictionary data is read, the CPU-X calculates the similarity indicating how similar is the appearance feature amount data extracted in the processing of ACT ST4 to the feature amount data of the recognition dictionary data (ACT ST23). The greater the similarity value is, the higher the similarity rate is. In the embodiment, the upper limit of similarity is set as "100", and the similarity of the feature amount data is calculated for each commodity.

The CPU-X confirms whether or not the similarity is higher than a specified reference threshold value (ACT ST24)

.The reference threshold value is the lower limit for the similarity of the commodity which should be retained as registered commodity candidate. As described above, if the upper limit value of similarity is set as "100", the reference threshold value, for example, can be set as "20" which is one fifth of the set upper limit value of similarity. When the similarity is higher than the level of the reference threshold value (YES in ACT ST24), the CPU-X retrieves the correction data 40 (ACT ST25). Afterwards, the CPU-X determines the existence of the correction data after checking the correction flag of the correction data of each commodity including the commodity ID of the recognition dictionary data read from the recognition dictionary 30 in the processing of ACT ST22 (ACT ST26: correction existence determination module 57).

If the correction flag is reset as "0", the CPU-X determines that the correction data doesn't exist (NO in ACT ST26). In such a condition, the CPU-X proceeds to the processing of ACT ST29. If the correction flag is set as "1", the CPU-X determines that the correction data exist (YES in ACT ST26). In such a condition, the CPU-X proceeds to the processing of ACT ST29 after executing the processing of ACT ST27 and ST28.

In ACT ST27, the CPU-X corrects the R value, the G value and the B value denoting the color in the appearance feature amount data extracted in the processing of ACT ST4 (correction module 56).

In ACT ST28, similar to the processing of ACT ST23, the CPU-X calculates the similarity indicating how similar is the corrected appearance feature amount data to the feature amount data of the recognition dictionary data read from the recognition dictionary 30 (re-execution module 58).

In ACT ST29, the CPU-X stores the commodity ID and the commodity name of the recognition dictionary data read from the recognition dictionary 30 in the processing of ACT ST22, the appearance feature amount data extracted in the processing of ACT ST4 and the similarity calculated in the processing of ACT ST23 or ACT ST28 in a specified area of the RAM 204 as the registered commodity candidate. In addition, even though the appearance feature amount data are corrected in the processing of ACT ST27, the appearance feature amount data stored in the processing of ACT ST29 are still the data before the correction.

In the condition that the processing of ACT ST29 is finished or the similarity is lower than the level of the reference threshold value in the processing of ACT ST24 (NO in ACT ST24), the CPU-X confirms whether or not the unprocessed recognition dictionary data exist in the recognition dictionary 30 (ACT ST30). If the unprocessed recognition dictionary data exist (YES in ACT ST30), the CPU-X returns to the processing of ACT ST22. Namely, the CPU-X further reads the unprocessed recognition dictionary data from the recognition dictionary 30, and executes the processing of ACT ST23-ST29.

In this way, after the processing of ACT ST23-ST29 is executed for the recognition dictionary data of all the commodities stored in the recognition dictionary 30 (NO in ACT ST30), the recognition processing is ended. After the recognition processing is ended, the CPU-X confirms the existence of the registered commodity candidate (ACT ST6).

The registered commodity candidate doesn't exist if no one commodity data (commodity code, commodity name, appearance feature amount, similarity) is stored as registered commodity candidate in the specified area of the RAM 204 (NO in ACT ST6). In this condition, the CPU-X returns to the processing of ACT ST2. Namely, the CPU-X acquires the next frame image data from the RAM 114. Then, the CPU-X executes the processing of ACT ST3 to ACT ST6 for the image data.

On the other hand, the registered commodity candidate exists if one commodity data (commodity code, commodity name, appearance feature amount, similarity) is stored as registered commodity candidate in the specified area of the RAM 204 (YES in ACT ST6). In this condition, the CPU-X confirms whether or not the registered commodity can be determined (ACT ST7). Specifically, the CPU-X confirms whether or not only one data of which the similarity is higher than the specified determination threshold value in the commodity data serving as registered commodity candidate exist. The determination threshold value is much greater than the reference threshold value, and in a condition that the upper limit value of similarity is set as "100" as stated above, the determination threshold value is set to be a value greater than half of the upper limit value, for example "60".

If there is only one commodity, of which the similarity is higher than the determination threshold value in the registered commodity candidate, the commodity is determined to be a registered commodity. In addition, if there is no commodity or more than two commodities, of which the similarity is higher than the determination threshold value, the registered commodity is not determined. If the registered commodity is determined (YES in ACT ST7), the CPU-X proceeds to the processing of ACT ST10. On the contrary, if the registered commodity is not determined (NO in ACT ST7), the CPU-X proceeds to the processing of ACT ST10 after executing the processing of ACT ST8 and ACT ST9.

In ACT ST8, the registered commodity candidate selection screen 60 is displayed in the touch panel 12 (accepting module 53).

Figure 10:
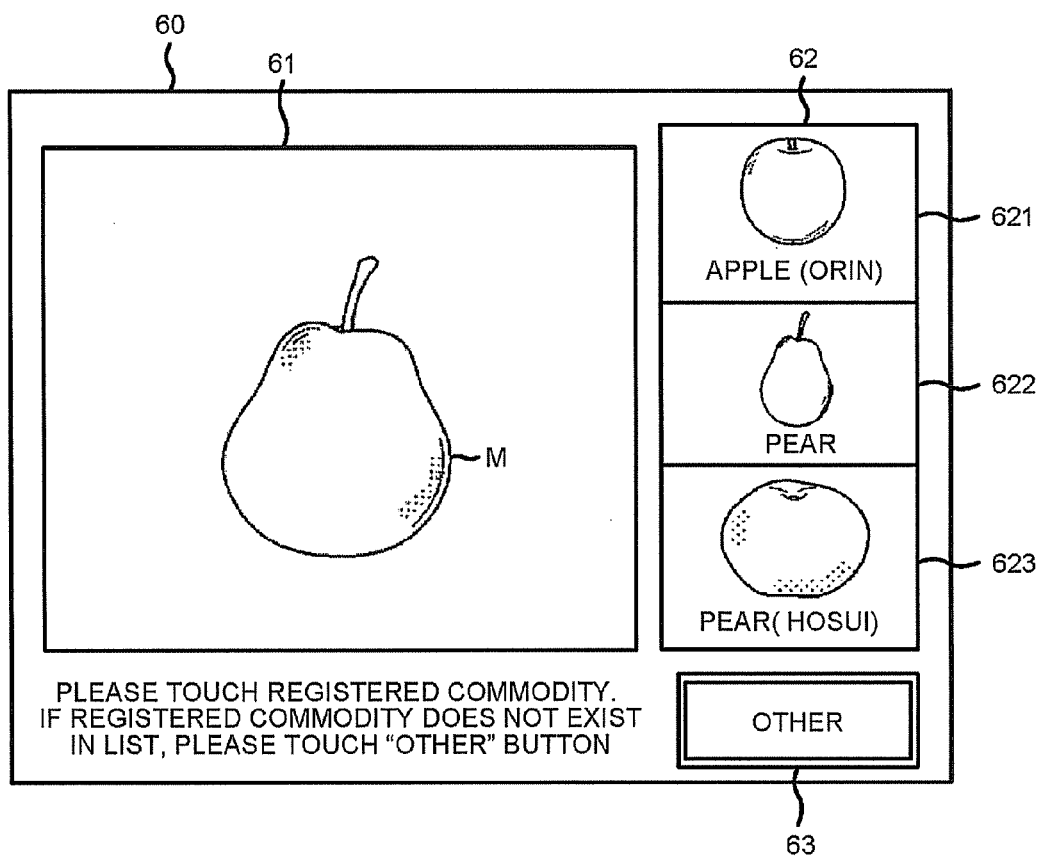
FIG. 10 is a diagram illustrating an example of a registered commodity candidate selection screen.

One example of the registered commodity candidate selection screen 60 is shown in FIG. 10. As shown in FIG. 10, the registered commodity candidate selection screen 60 is divided into a captured image display area 61 and a candidate commodity display area 62. In addition, the "Other" button 63 is displayed on the selection screen 60. The frame image acquired in the processing of ACT ST2 is displayed in captured image display area 61. The candidate commodity display area 62 is further divided into three areas 621, 622, 623 to display preset images of the commodities registered as the commodity candidate which are sorted in descending order by similarity from the upper part of a screen to the lower part of a screen. The preset image is stored for each commodity ID in the commodity master file in which the commodity name, price and the like are set by relating to the commodity ID of each commodity.

In addition, in the initial screen, the preset images of commodities of which the similarity is ranged at the first to the third are displayed in the candidate commodity display area 62 (621, 622, 623) from the upper part of the screen in order. In this state, if the "Other" button 63 is touched, the candidate commodity display area 62 is switched to display the preset images of the commodities of which the similarity is ranged at the forth to the sixth. In addition, every time the "Other" button 63 is touched, the area 62 is switched to display the preset images of the commodities of which the similarity is ranged at more rear place. If the "Other" button 63 is touched for one time, the image of the "Return" button is displayed on the selection screen 60. And, if the "Return" button is touched, the screen of the touch panel 12 returns to the most recent selection screen 60.

The user holding the registered commodity over the reading window 1B looks for the registered commodity in the candidate commodity display area 62. And, if the registered commodity is found, the user touches the area 621, 622 or 623 where the preset image of the commodity is displayed.

The CPU-X waits until the candidate commodity display area 62 is touched in ACT ST9. If the candidate commodity display area 62 is touched (YES in ACT ST9), the CPU-X determines the commodity of which the preset image is displayed in the touch area to be a registered commodity. Then the CPU-X proceeds to the processing of ACT ST10.

In ACT ST10, the CPU-X carries out registration processing on commodity sales data based on the price of the commodity determined as the registered commodity. After the registration processing is finished, the CPU-X determines whether or not the commodity selected from the registered commodity candidate selection screen 60 is not the commodity with the highest similarity (ACT ST11). Afterwards, if the commodity with the highest similarity is selected (NO in ACT ST11), the CPU-X ends the present processing. Moreover, in the condition that the registered commodity is determined in the processing of ACT ST7, it also proceeds to "NO" in the processing of ACT ST11, and therefore, the present processing will be ended.

Figure 9:
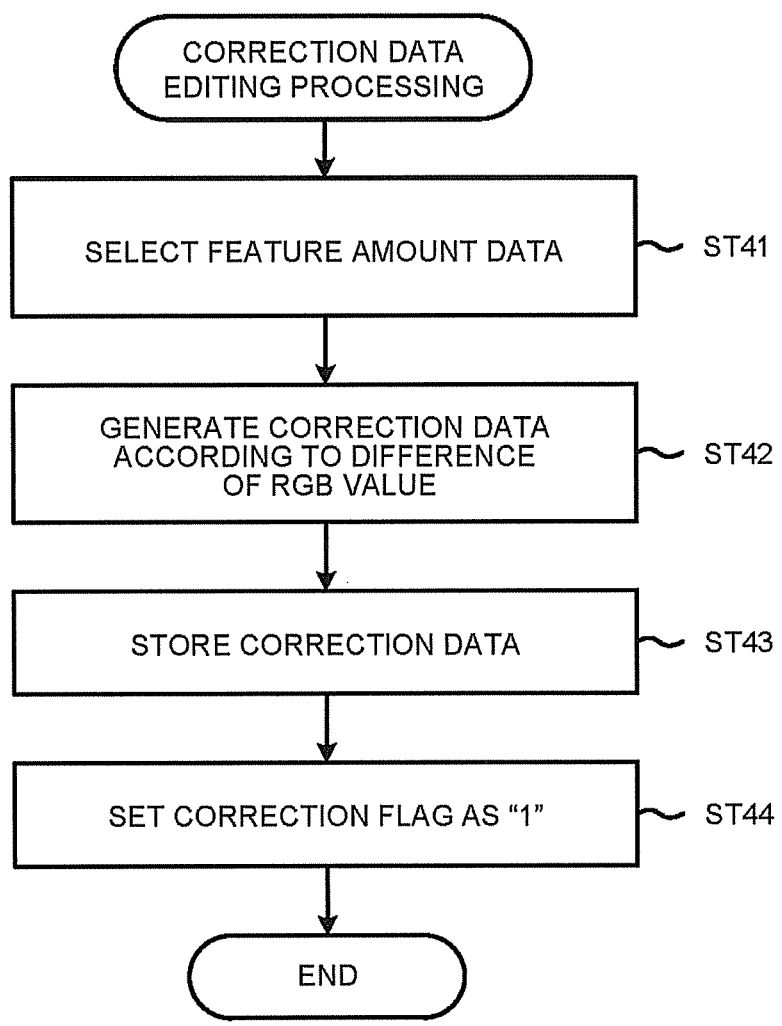
FIG. 9 is a flowchart specifically illustrating the procedure of the correction data editing processing shown in ACT ST12 in FIG. 7.

On the contrary, if the commodity with the highest similarity is not selected (YES in ACT ST11), the CPU-X executes the correction data editing processing specifically shown in FIG. 9 (ACT ST12).

First, the CPU-X acquires the total feature amount data 1-N of the commodity of which the similarity is ranged after the second selected from the registered commodity candidate from the recognition dictionary 30. Afterwards, the appearance feature amount data extracted in the processing of ACT ST4 are respectively compared with the total feature amount data 1-N, and the feature amount data i (1≤i≤N) most approximate to the appearance feature amount data are selected (ACT ST41).

Subsequently, about the feature amount data i and the appearance feature amount data, the CPU-X acquires the difference of the parameters respectively indicating the color of the R value, the G value and the B value to create the correction data (ACT ST42: correction data generating module). For example, if the parameters indicating the color of the R value, the G value and the B value of the feature amount data i, are respectively "100", "50" and "30", and the parameters indicating the color of the R value, and the G value and the B value of the appearance feature amount, are respectively "90", " "50" and "40", the correction data [R value, G value, B value] are [10, 0, −10].

In this way, if the correction data are created, the CPU-X retrieves the correction data 40, and overwrites the correction data corresponding to the commodity ID of the commodity selected from the registered commodity candidate with the correction data generated in the processing of ACT ST42 (ACT ST43: storage module). In addition, in the condition that the correction flag corresponding to the commodity ID is reset as "0", the CPU-X sets the correction flag as "1" (ACT ST44).

Hereinbefore, the correction data editing processing is ended. After the correction data editing processing is ended, the present processing is ended.

In this way, in the store checkout system of the present embodiment, when a user holds the commodity over the reading window 1B of the scanner apparatus 1, the commodity is captured by the image capturing section 14. Afterwards, the similarity of the feature amount is calculated for each commodity according to the appearance feature amount data of the commodity extracted from the image of the commodity and the feature amount dada of each commodity registered in the recognition dictionary 30. Afterwards, the registered commodity candidate is determined in descending order of similarity and the selection screen 60 is displayed on the touch screen 12. Therefore, the user selects commodity to be settled from the registered commodity candidate. Thus, in the store checkout system, the sales data of the selected commodity are registered.

For example, the registered commodity candidate selection screen 60 shown in FIG. 10 is displayed on the touch panel 12. In such a condition, the user touches the area 622 displaying the preset image of the commodity "pear" to select the commodity "pear". Thus, in the POS terminal 2, the sales data of the commodity "pear" are registered.

Herein, compared with the commodity "apple (ORIN)", the similarity of the commodity "pear" is lower. That is because the difference exists in the surface color of the commodity "pear" between the image of the commodity "pear" used for registering the feature amount data in the recognition dictionary 30 and the image of the commodity "pear" captured by the image capturing section 14. For the fruit as the commodity "pear" and the vegetable, according to the difference of producing district and harvest time, even though it is the same variety, the delicate difference also exists in the surface color.

Therefore, in the present embodiment, in the condition that the commodity with the highest similarity is not selected, about the parameters (the R value, the G value, the B value) related to the color in the feature amount data, the difference between the data of the recognition dictionary 30 and the captured image data is calculated to generate the correction data. Afterwards, about the commodity of which the correction data are generated, subsequently, after the parameters (the R value, the G value, the B value) related to the color of the appearance feature amount of the commodity extracted from the captured image is corrected with the correction data, the similarity and the feature amount data of each commodity of the recognition dictionary 30 are determined.

Generally, the producing district and the harvest time of the commodity such as the fruit, the vegetable and the like arriving in one purchase are the same. Therefore, the surface colors of the commodities are all similar. Therefore, even though the similarity is ranked below the second before the correction, the similarity is improved, maybe to the first, after the correction. That is, the recognition precision is improved. In addition, the proportion of determining the registered commodity in the processing of ACT ST7 of FIG. 7 is also improved, and therefore, the processing efficiency is improved.

A Second Embodiment

Next, the second embodiment is described. In addition, the portion common with the first embodiment is endowed with the same symbol, and detailed descriptions are omitted.

Figure 11:
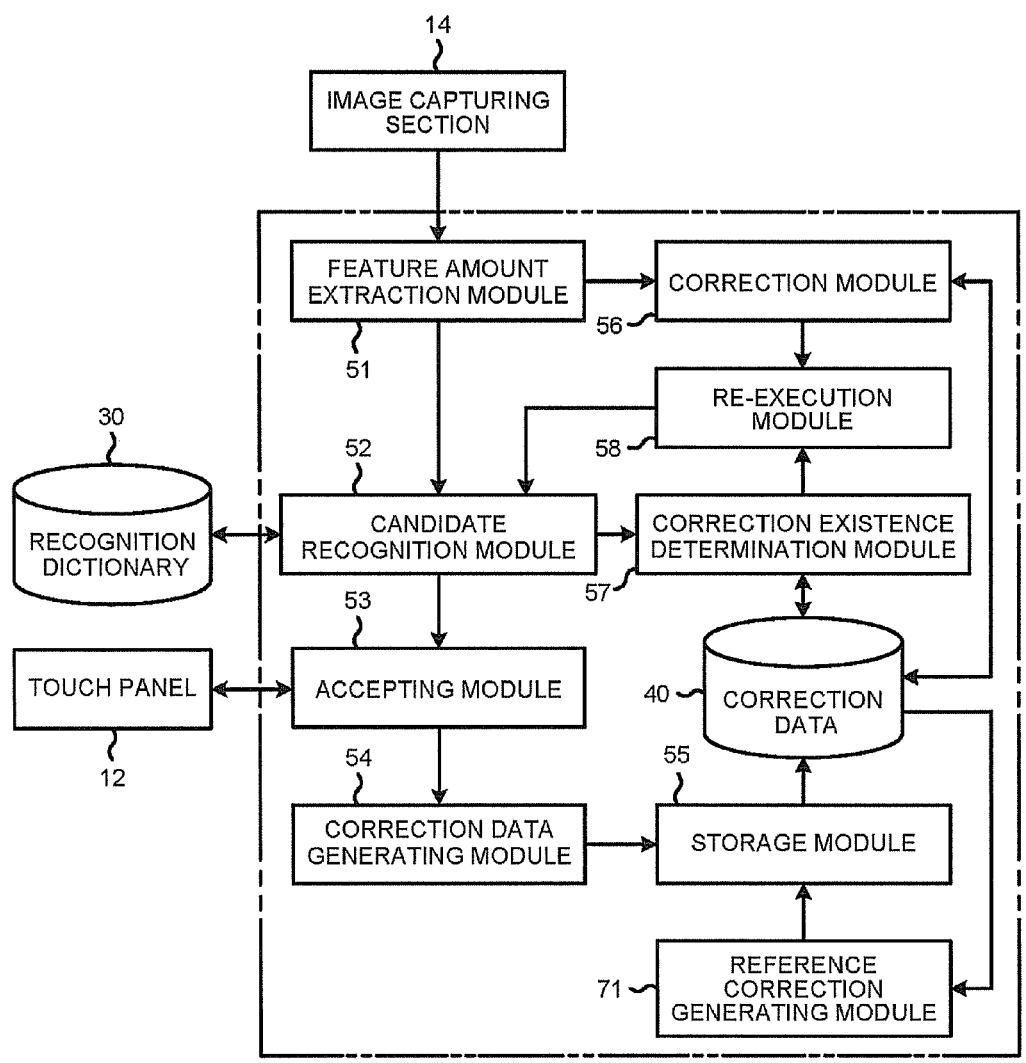
FIG. 11 is a functional block diagram of the commodity recognition apparatus according to a second embodiment.

FIG. 11 is a block diagram for describing the function of the commodity recognition apparatus according to the second embodiment. By comparing FIG. 6 with FIG. 11, it is known that the difference between the second embodiment and the first embodiment lies in that the commodity recognition apparatus is added with a reference correction generating module 71. The reference correction generating module 71 generates reference correction data according to each correction datum stored in the correction data 40 for each commodity. For example, for the data correcting the R value, the G value and the B value of each correction datum, an average value is respectively calculated, and the correction data average values of the R value, the G value and the B value are regarded as the reference correction data.

When the number of the correction data except the initial value stored in the correction data 40 exceeds a specified value N (N>1, for example, 20), the storage module 55 stores the reference correction data generated by the reference correction generating module 71 in the correction data 40 as the correction data of other commodity of which the correction data are the initial value.

Figure 12:
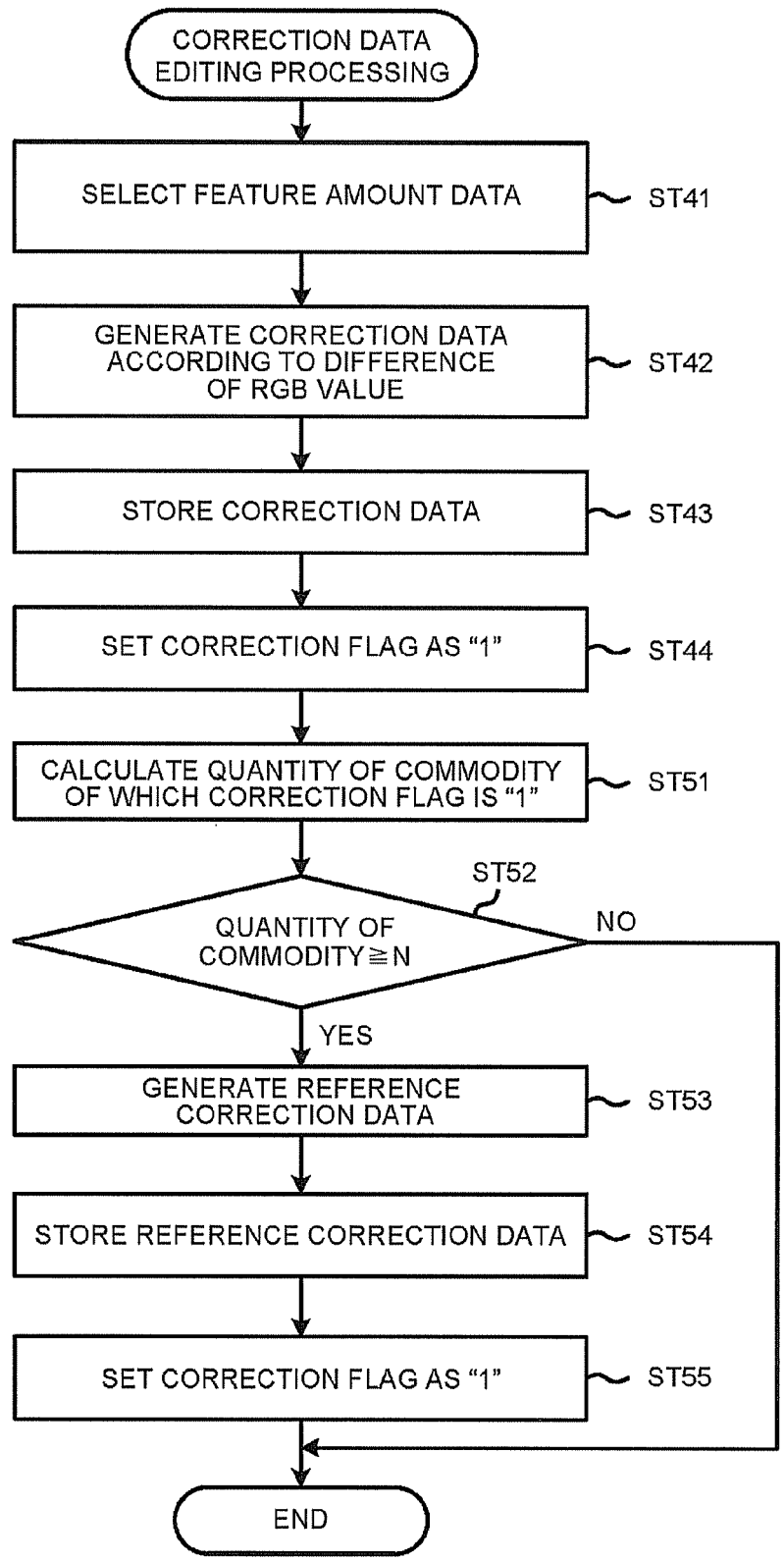
FIG. 12 is a flowchart specifically illustrating the procedure of the correction data editing processing according to the second embodiment.

FIG. 12 is a flowchart illustrating the procedure of the correction data editing processing in the second embodiment. The processing of ACT ST41-ST44 is the same as that of the first embodiment. In the second embodiment, the CPU-X executes the processing of ACT ST51-ST55 after ACT ST44.

In ACT ST51, the CPU-X retrieves the correction data 40. Afterwards, the CPU-X counts the quantity of a record of which the correction flag is set as "1", namely, counts the quantity of the commodity of which the correction data except the initial value are set.

In ACT ST52, the CPU-X determines whether or not the quantity of the commodity of which the correction data except the initial value are set reaches the specified value N. In the condition that the quantity of the commodity is less than the specified value N (NO in ACT ST52), the present correction data editing processing is ended.

On the contrary, in the condition that the quantity of the commodity is above the specified value N (YES in ACT ST52), the CPU-X generates the reference correction data according to the correction data of each commodity stored in the correction data 40 (ACT ST53: reference correction generating module 71). Next, the CPU-X overwrites the correction data of the record of which the correction flag of the correction module 40 is reset as "0" with the reference correction data mentioned above (ACT ST54). In addition, the CPU-X sets all the correction flags of the correction data 40 as "1" (ACT ST55). Thus, the present correction data editing processing is ended.

As described above, that the similarity between the appearance feature amount of the commodity to be settled and the feature amount data of the commodity registered in the recognition dictionary 30 is ranked below the second is because the color difference exists between the commodity image used for registering the feature amount data in the recognition dictionary 30 and the image of the settled commodity captured by the image capturing section 14. As its reason, it is possibly because, as described in the first embodiment, the difference actually exists in the surface color of the commodity, and it is also possibly because of the difference of an environment for capturing the commodity, for example, an image capturing apparatus, a light source and the like. If it is because of the difference of the image capturing environment, it is necessary for each commodity to correct irrespective of variety, these tendency are similar.

Therefore, in the second embodiment, in the condition that the correction data are generated for the specified value N, for example, 20 commodity items, which is specified that is caused by a difference of an image capturing environment, the commodity recognition apparatus regards the difference of the image capturing environment as the major reason. Afterwards, the commodity recognition apparatus respectively calculates the average value for the data correcting the R value, the G value and the B value of each correction datum, and regards the correction data average values of the R value, the G value and the B value as the reference correction data. The commodity recognition apparatus also sets the reference correction data mentioned above for the commodity of which the correction data are not generated. In this way, the low recognition rate caused by the difference of the image capturing environment can be improved, so that the recognition precision can be improved.

A Third Embodiment

Next, the third embodiment is described. In addition, the portion tommon with the second embodiment is endowed with the same symbol, and the detailed descriptions are omitted.

Figure 13:
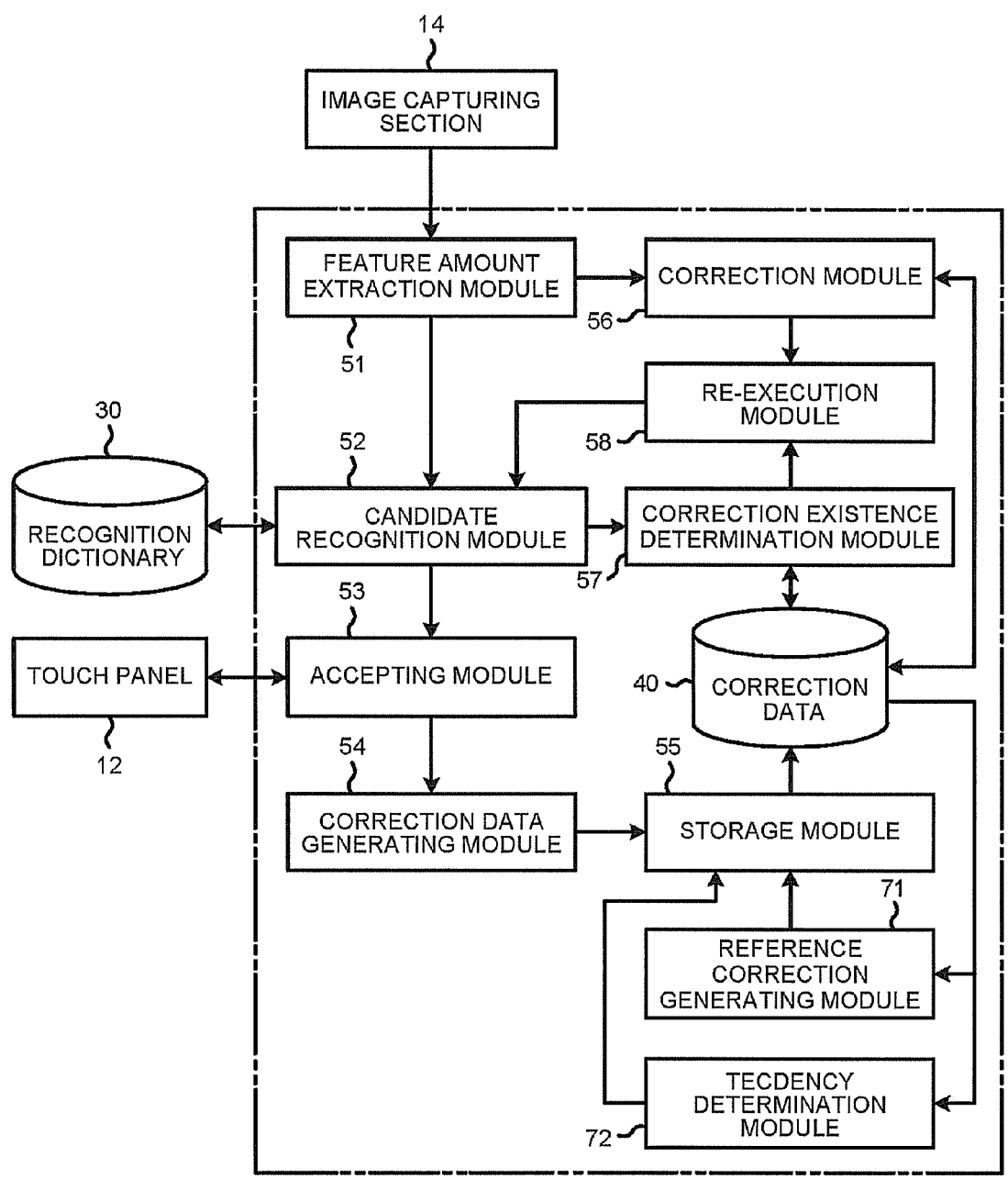
FIG. 13 is a functional block diagram of the commodity recognition apparatus according to a third embodiment.

FIG. 13 is a block diagram for describing the function of the commodity recognition apparatus according to the third embodiment. By comparing FIG. 11 with FIG. 13, it can be known that the difference between the third embodiment and the second embodiment lies in that a tendency determination module 72 is added. The tendency determination module 72 determines whether or not the tendency of each correction datum stored for each commodity by the correction data 40 is similar.

Figure 14:
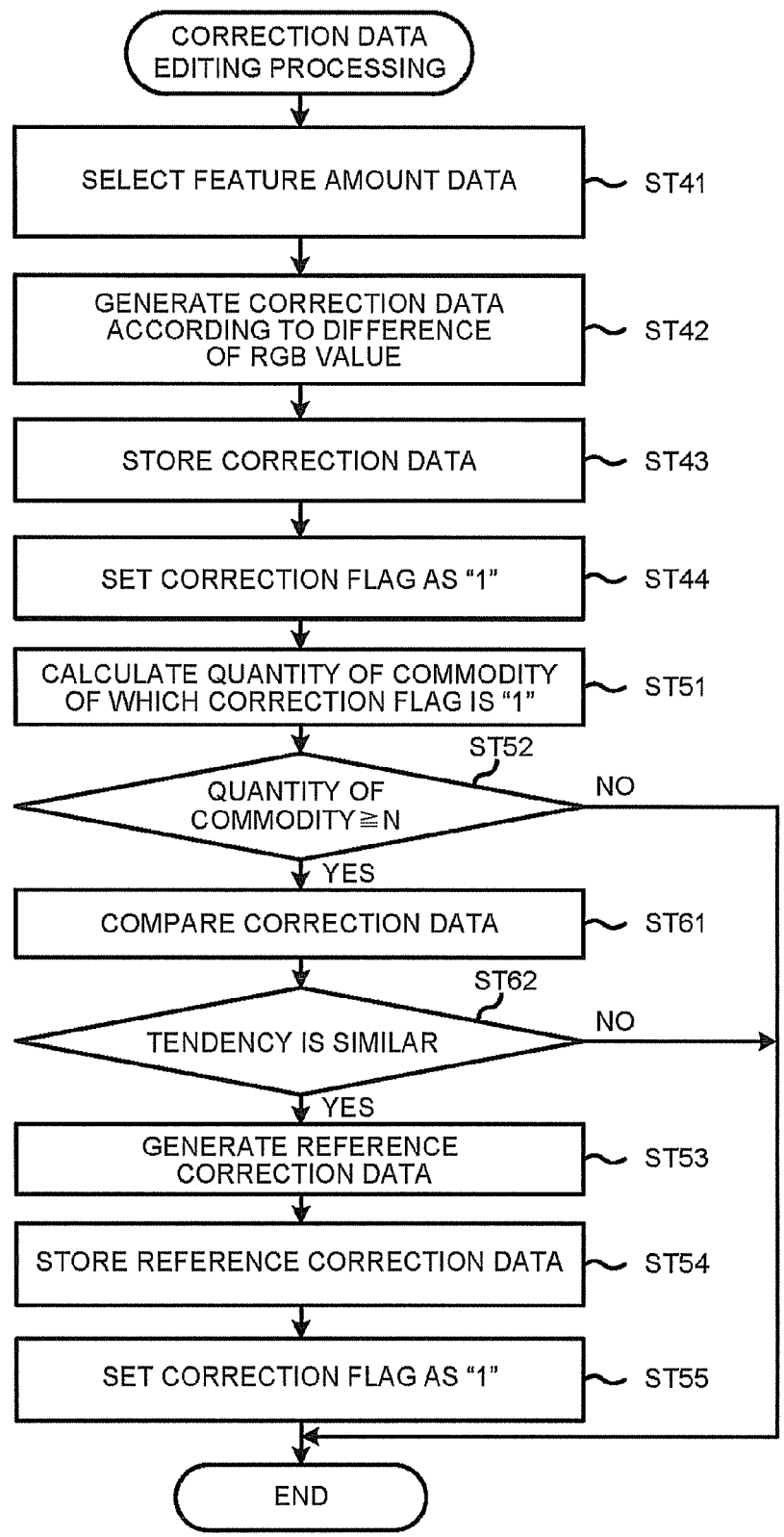
FIG. 14 is a flowchart specifically illustrating the procedure of the correction data editing processing according to the third embodiment.

FIG. 14 is a flowchart illustrating the procedure of the correction data editing processing according to the third embodiment. The difference between the third embodiment and the second embodiment lies in that the processing of ACT ST61 and ACT ST62 will be executed when the quantity of the commodity of which the correction data except the initial value are set reaches the specified value N (YES in ACT ST52) in the determination processing of ACT ST52.

In ACT ST61, the CPU-X compares the correction data except the initial value. Afterwards, the CPU-X determines whether or not the tendency of the correction data is similar in ACT ST62 (tendency determination module 72). When a correction value of the correction data for eighty percent of the correction data for the specified value N, for example, 20 commodity items, which is specified that is caused by a difference of an image capturing environment, namely the correction data for 16 commodity items are similar, the tendency of the correction data is regarded to the similar. Even though the correction value of the correction data for the seventy percent commodities is similar, if the correction value of the residual thirty percent correction data are not similar, the tendency of the correction data is not regarded to be similar. In addition, of course, the reference for determining whether or not the correction data is similar is not particularly limited.

If the tendency of the correction data is not similar (NO in ACT ST62), the correction data editing processing is ended. On the contrary, if the tendency of the correction data is similar (YES in ACT ST62), the CPU-X executes the processing of ACT ST53-ST55 in the second embodiment. Namely, the CPU-X generates the reference correction data according to the correction data of each commodity stored in the correction data 40 (ACT ST53: reference correction generating module 71). Next, the CPU-X overwrites the correction data of the record of which the correction flag of the correction module 40 is reset as "0" with the reference correction data mentioned above (ACT ST54) In addition, the CPU-X sets all the correction flags of the correction data 40 as "1" (ACT ST55). Thus, the present correction data editing processing is ended.

As described in the second embodiment, one of the reasons why the difference is generated on the color between the image of the commodity used for registering the feature amount data in the recognition dictionary 30 and the image of the settled commodity captured by the image capturing section 14 is the difference of the image capturing environment, and in such a condition, the tendency of the correction is similar.

Therefore, in the third embodiment, only in the condition that the tendency of the correction data is similar, the commodity recognition apparatus regards it as an error caused by the difference of the image capturing environment. Afterwards, the commodity recognition apparatus respectively calculates the average value for the data correcting the R value, the G value and the B value of each correction data, and regards the correction data average value of the R value, the G value and the B value as the reference correction data. The commodity recognition apparatus also sets the reference correction data mentioned above for the commodity of which the correction data are not generated. In this way, the low recognition rate caused by the difference of the image capturing environment can be reliably improved, so that the recognition precision can be improved.

The present invention is not limited to each embodiment mentioned above.

For example, in the embodiment mentioned above, the commodity recognition apparatus comprises the correction existence determination module 57 and the re-execution module 58, but the recognition rate of the commodity recognition apparatus can be also improved by using other modules to recognize the commodity with the corrected appearance feature amount.

In the embodiment mentioned above, the value of the parameter related to the color is used as the correction data, but the correction data are not limited to these. For example, a parameter value related to the appearance shape, pattern and the concave-convex situation can be also included in the correction data.

In the embodiment mentioned above, the scanner apparatus 1 and the POS terminal 2 are enabled to have the function as the commodity recognition apparatus, but the single scanner apparatus 1 or the POS terminal 2 can be also enabled to have the function as the commodity recognition apparatus. Alternatively, an apparatus integrated by incorporating the scanner apparatus 1 into the POS terminal 2 can be also enabled to have the function as the commodity recognition apparatus. As an example of the apparatus integrated by incorporating the scanner apparatus 1 into the POS terminal 2, for example, there is a self-checkout terminal executing the registration processing of the commodity by the customer himself and the like. In addition, a stationary type scanner apparatus is not always adopted, and the manner connecting a so-called handy type scanner to the POS terminal can be also adopted.

In the embodiment, a control method which can realize the function of the present invention is prerecorded in the auxiliary storage section 205 as a method storage section inside the apparatus. However, it is not limited to this, and the same method can be also downloaded in the apparatus from the network. Alternatively, the same method recorded in a recording medium can be also installed in the apparatus. So long as the recording medium is an apparatus which can store the method such as a CD-ROM, a memory card and the like, and furthermore, is readable to the apparatus, its form can be random. In addition, the function acquired by the installation and the downloading of the method can also be realized by cooperating with an OS (Operating System) and the like inside the apparatus. Moreover, the method of the present embodiment can be also incorporated in a mobile phone with a communication function and a portable information terminal such as a so-called PDA to realize the function.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A commodity recognition apparatus, comprising:
a feature amount extraction module configured to extract feature amount of a commodity included in an image captured module;
a candidate recognition module configured to compare the feature amount data stored in a recognition dictionary file in which feature amount data of commodities are stored to recognize the candidate of the commodity contained in the image;
an accepting module configured to accept the selection input of the commodity included in the image from a commodity candidates in a condition that the commodity candidates are recognized by the candidate recognition module;
a correction data generating module configured to generate correction data according to the feature amount data of the commodity of which the selection input is accepted by the accepting module and the appearance feature amount data extracted by the feature amount extraction module;
a storage module configured to store the correction data generated by the correction data generating module by relating to the commodity recognition data specifying the commodity of which the selection input is accepted; and
a correction module configured to correct the appearance feature amount of the commodity extracted by the feature amount extraction module according to the correction data.

2. The commodity recognition apparatus according to claim 1, comprising:
a correction existence determination module configured to determine whether or not the correction data are stored for the commodity recognized as the candidate of the commodity included in the image by the candidate recognition module; and
a re-execution module configured to enable the candidate recognition module to carry out re-execution by utilizing the appearance feature amount corrected by the correction module if it is determined that the correction data are stored by the correction existence determination module.

3. The commodity recognition apparatus according to claim 1, wherein
the correction data generating module does not generate correction data when the similarity between the feature amount data stored in the recognition dictionary of the commodity of which the input selection is accepted by the accepting module and the appearance feature amount data extracted by the feature amount extraction module is the highest compared with the similarity between the feature amount data stored in the recognition dictionary of other commodity recognized by the candidate recognition module as a candidate and the appearance feature amount data extracted by the feature amount extraction module; and generates correction data when the former similarity is lower compared with the later similarity.

4. The commodity recognition apparatus according to claim 1, further comprising:
   a reference correction generating module configured to generate reference correction data according to each correction datum stored for each commodity, wherein
   the storage module stores the reference correction data generated by the reference correction generating module as the correction data for the commodity of the recognition object of which the feature amount data are stored in the recognition dictionary when the quantity of the correction data stored in the storage module exceeds a specified value.

5. The commodity recognition apparatus according to claim 4, further comprising:
   a tendency determination module configured to determine whether or not the tendency of each correction datum stored for each commodity is similar, wherein
   the storage module stores the reference correction data generated by the reference correction generating module as the correction data for the commodity of the recognition object of which the feature amount data are stored in the recognition dictionary if the quantity of the stored correction data exceeds the specified value and it is determined that the tendency of each correction datum is similar by the tendency determination module.

6. A commodity recognition method, comprising:
   extracting the appearance feature amount of a commodity included in an image captured by an image capturing module;
   recognizing a candidate of a commodity included in the image by comparing the extracted appearance feature amount data with feature amount data of a recognition dictionary storing the feature amount data denoting the surface information of the commodity for each commodity serving as a recognition object;
   accepting the selection input of the commodity included in the image from a plurality of commodity candidates in a condition that the plurality of commodity candidates are recognized;
   generating correction data according to the feature amount data of the commodity of which the selection input is accepted and the extracted appearance feature amount data;
   storing the generated correction data by relating to the commodity recognition data specifying the commodity of which the selection input is accepted; and
   correcting the extracted appearance feature amount of the commodity according to the stored correction data.

* * * * *